D. H. KABAKJIAN.
IMPREGNATION OF WATER WITH RADIUM EMANATIONS.
APPLICATION FILED MAY 16, 1918.
1,309,139.
Patented July 8, 1919.
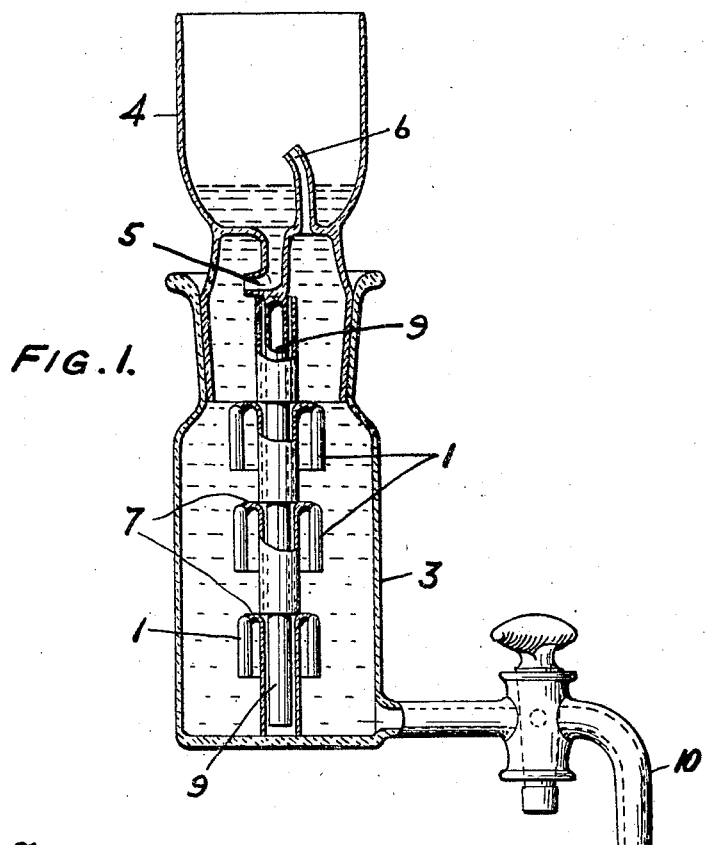
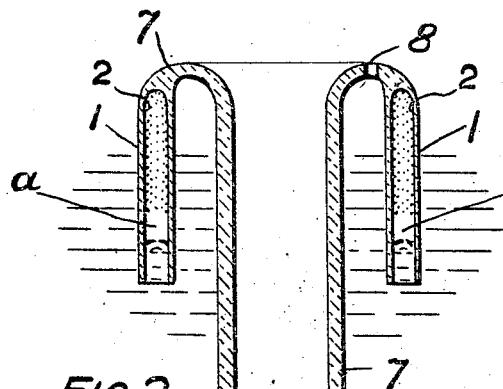
FIG.2.
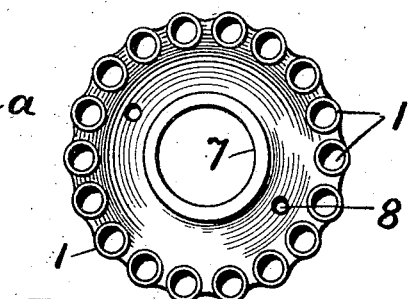
FIG.3.

UNITED STATES PATENT OFFICE.

DICRAN H. KABAKJIAN, OF LANSDOWNE, PENNSYLVANIA.

IMPREGNATION OF WATER WITH RADIUM EMANATIONS.

1,309,139.  Specification of Letters Patent.  Patented July 8, 1919.

Application filed May 16, 1918. Serial No. 234,854.

*To all whom it may concern:*

Be it known that I, DICRAN H. KABAKJIAN, a citizen of the United States, and a resident of Lansdowne, in the county of Delaware and State of Pennsylvania, have invented certain new and useful Improvements in the Impregnation of Water with Radium Emanations, of which the following is a specification.

Various compounds and substances giving off radium emanations, useful for impregnating water, although supposed to be more or less insoluble are, in fact, soluble to such a degree that their permanent contact with water is productive of waste and loss of radium.

The principal object of the present invention is to avoid waste and loss of radium by solution in transferring radium emanations to water, or other appropriate liquid, to render it radio-active for therapeutic or other purposes.

According to the present invention the water to be impregnated and the substance or compound giving off the radium emanations are separated or kept apart and out of contact with each other by air confined, as in an inverted receptacle of substantially cup-shape immersed in the water and containing in its upper portion the substance or compound from which emanations reach the water through the confined air.

In the drawings, forming part hereof, Figure 1, is an elevational view, principally in section, and Figs. 2, and 3, are respectively a central section and plane view of the underside of one of the elements shown in Fig. 1, but drawn to an enlarged scale.

In the drawings 1, is a radium carrier of substantially inverted cup-shape, or bell shape. 2, is a substance or compound giving off radium emanations, and it is applied to or arranged at the upper portion of the carrier. 3, is a vessel containing water which is to be impregnated with the radium emanations and in which the carrier is immersed. Air confined in the carrier, as at *a*, Fig. 2, prevents the water from rising in the carrier 1, high enough to contact with the substance or compound 2, so that the water and compound or substance are kept apart or separated, although the emanations passing through the confined air impregnate the water. Under these conditions of separation it is manifestly impossible to lose radium by solution in the water. The bore of the carrier 1, may be small enough, for example one-twenty-fifth of an inch, more or less, to retain a small drop of water sufficient to act as a seal for the confined air, when the main body of water is drawn off and before a new supply is added. When this is done the confined air impregnated with radium emanations is saved. To insure complete filling of the vessel 3, the latter may be provided with a funnel 4, communicating with its interior by a water intake 5, proper provision for air venting being made, as by means of an upwardly extending air vent tube 6. The carriers 1, are shown as arranged in annular groups, depending from supports 7, which in turn are shown as vented at 8, in order to avoid trapping air. 9, is a guide rod for the supports 7, and it is shown as suspended from the bottom of the funnel 4, and if tubular its bottom is sealed to keep air out of it.

In use the vessel 3, is filled by way of the funnel 4, with the liquid to be impregnated, usually, though not exclusively, water. The vent 6 permits of the expulsion of all the air, except that confined, as at *a*, in the radium carriers 1, and this confined air keeps the liquid and substance or compound 2, out of contact, while permitting of the transfer of the emanations from one to the other through it. The water having remained in the vessel for a sufficient time for becoming radio-active, is drawn off at the tap or spigot 10, for use; and by repetition more supplies of water may be made radio-active. When the water is drawn off and if the carriers 1, are of sufficiently small bore, drops of liquid are quite firmly held at their lower open ends and these drops serve to prevent or oppose the escape of the confined air.

In describing the invention in the appended claims I shall refer to the radium carriers as being of "inverted cup-shape", intending to cover equivalent shapes which operate by retaining air to keep water from coming into contact with the compound and still permit of free diffusion of the emanations through the confined air into the water.

What I claim is:

1. Apparatus for impregnating water with radium emanations comprising, in combination, a vessel adapted to be filled with water, a carrier impervious to liquids and gases immersed in the water, and an air seal separating the radium and the water, said seal enabling the emanations to diffuse into the water.

2. Apparatus for impregnating a liquid with radium emanations comprising a receptacle for the liquid to be charged, a cup-shaped carrier having a layer of radium substance deposited on its inner walls adjacent to the bottom of the cup, and a support arranged to maintain the cup in a position with a layer of protective air trapped between the radium and the liquid.

3. The process of impregnating water with radium emanations which consists in arranging the radium to present a maximum emanating surface and causing the emanations therefrom to diffuse through a layer of protective gas maintained between said radium surface and the liquid to be impregnated.

DICRAN H. KABAKJIAN.